United States Patent
Shishido et al.

[11] Patent Number: 6,154,255
[45] Date of Patent: Nov. 28, 2000

[54] MOUNT SHIFT APPARATUS OF LENS FOR CCTV CAMERA

[75] Inventors: Takayasu Shishido; Minoru Itoh, both of Tokyo, Japan

[73] Assignee: Asahi Seimitsu Kabushiki Kaisha, Tokyo, Japan

[21] Appl. No.: 08/868,257

[22] Filed: Jun. 3, 1997

[30] Foreign Application Priority Data

Oct. 14, 1996 [JP] Japan .................................. 8-270873
Oct. 25, 1996 [JP] Japan .................................. 8-283676

[51] Int. Cl.[7] .......................... H04N 5/225; G03B 17/00; G02B 7/02
[52] U.S. Cl. ........................... 348/375; 396/529; 359/819
[58] Field of Search ...................... 348/335, 373, 348/375; 359/819, 822, 830, 829, 813; 396/529, 530, 533

[56] References Cited

U.S. PATENT DOCUMENTS

| 2,937,571 | 5/1960 | Thompson | 359/819 |
|---|---|---|---|
| 3,463,019 | 8/1969 | Noe | 359/813 |
| 3,620,149 | 11/1971 | Ogihara | 359/829 |
| 3,828,991 | 8/1974 | Moore | 359/819 |
| 3,989,358 | 11/1976 | Melmoth | 359/813 |
| 4,081,812 | 3/1978 | Flöther . | |
| 4,734,778 | 3/1988 | Kobayashi | 348/335 |
| 5,003,401 | 3/1991 | Otsuka . | |
| 5,160,956 | 11/1992 | Watanabe et al. | 396/529 |
| 5,172,276 | 12/1992 | Ueyama et al. | 359/813 |
| 5,194,988 | 3/1993 | Flöther et al. . | |
| 5,483,384 | 1/1996 | Takizawa et al. . | |
| 5,774,282 | 6/1998 | Kohmoto et al. | 359/823 |
| 5,798,875 | 8/1998 | Fortin et al. | 359/813 |

FOREIGN PATENT DOCUMENTS 0179426 3/1986 European Pat. Off. .

OTHER PUBLICATIONS

Patent Abstracts of Japan 53–102029 E–70, vol. 2, No. 134, P 8299, Jun. 9, 1978.
United Kingdom Search Report issued Jul. 30, 1997.

Primary Examiner—Wendy Garber
Assistant Examiner—Luong Nguyen
Attorney, Agent, or Firm—Greenblum & Bernstein, P.L.C.

[57] ABSTRACT

A mount shift apparatus of a lens for a CCTV camera includes a mount frame which is provided with a threaded portion which can be screw-engaged by a body mount of a camera body, a lens frame which supports a photographing lens group and which is supported to move relative to the mount frame in a direction perpendicular to the optical axis, and a mount shift device which adjusts the position of the lens frame with respect to the mount frame in the direction perpendicular to the optical axis.

3 Claims, 9 Drawing Sheets

MOUNT SHIFT APPARATUS OF LENS FOR CCTV CAMERA

BACKGROUND OF THE INVENTION

1. Field of the Invention

The present invention relates to a lens mount for a CCTV (closed-circuit television) in which the lens is attached to a camera body by a threaded mount (hereinafter referred to as a screw mount), and more precisely, it relates to a mount shift apparatus in which the positional relationship between the optical axis and a light receiving surface of an image pickup device (CCD) can be adjusted when the lens is attached to the camera body.

2. Description of the Related Art

A lens mount for a CCTV camera is generally made of a screw mount such as a C-mount or CS-mount. In a screw mount, the center axis of the thread of the mount frame of the lens mount may deviated from the center of the optical system (optical axis) due to the screw engagement or screw fitting. Similarly, the center axis of the thread of the body mount may deviated from the center axis of the CCD which defines the light receiving surface. Consequently, when the lens is attached to the camera body, the center axis of the light receiving surface (light receiving surface center) is displaced from the optical axis. The deviation or displacement, which varies depending on the camera, is generally approximately within ±0.3 mm.

The deviation is not serious in a monitoring system using a CCTV. However, if the CCTV were used for a measurement in an image processing system, the deviation of the light receiving surface center from the optical axis makes a precise measurement impossible. Moreover, in the case of a fish-eye lens (all sky lens) which covers a view angle of 180°, a circular image formed by the fish-eye lens may be eclipsed.

There are known adjusting mechanisms which control the posture of the lens in the direction of rotation to mount the screw mount using a securing or set screw, etc. However, there is no know apparatus which corrects the deviation between the light receiving surface center and the optical axis in two orthogonal directions in a plane perpendicular to the optical axis.

SUMMARY OF THE INVENTION

It is an object of the present invention to provide an inexpensive mount shift apparatus of a lens for a CCTV camera in which a deviation between the optical axis and the light receiving surface of the camera body, produced when the screw mount of the photographing lens is attached to the camera body, can be easily corrected.

To achieve the object mentioned above, according to the present invention, there is provided a mount shift apparatus of a lens for a CCTV camera comprising a mount frame which is provided with a threaded portion which can be screw-engaged by a body mount of a camera body, a lens frame which supports a photographing lens group and which is supported to move relative to the mount frame in a direction perpendicular to the optical axis, and a mount shift adjusting mechanism for adjusting the position of the lens frame with respect to the mount frame in the direction perpendicular to the optical axis.

In an embodiment, the lens frame comprises a mount set ring integral with the lens frame. The mount set ring can be provided with a cylindrical portion opposed to the outer peripheral surface of the mount frame. The mount shift adjusting mechanism can comprise the outer peripheral surface of the mount frame, the cylindrical portion, and more than two rotatable shift screws which are screw-engaged by the cylindrical portion and which abut against the outer peripheral surface of the mount frame.

Preferably, the lens frame and the mount set ring define annular spaces in which the lens frame and the mount set ring can be moved with respect to the mount frame in the direction perpendicular to the optical axis. With this arrangement, the optical axis can be shifted within the spaces.

There are preferably four shift screws which are provided on the outer peripheral surface of the cylindrical portion of the mount set ring at an equiangular distance of 90° about the optical axis.

The shift screws can be each provided with a manual operation knob which can protrude outward from the outer peripheral surface of the mount set ring. It is possible to manually rotate the shift screws without using a tool such as a screwdriver.

The mount frame and the lens frame are relatively rotatable. Consequently, the registration of marks of the lens barrel in the circumferential direction of a lens barrel or a radially extending projection of the lens barrel can be facilitated.

It is preferable that a resilient or biasing member be provided between the mount frame and the lens frame to hold the angular position and adjusted position of the lens frame or the mount frame.

Preferably, the mount frame and the lens frame are held so as not to move in the optical axis direction.

According to another aspect of the present invention, there is provided a mount shift apparatus of a lens for a CCTV camera comprising a mount frame which is provided with a threaded portion which can be screw-engaged by a screw mount of a camera body, a lens frame which supports a photographing lens group, opposed end surfaces which are formed on the mount frame and the lens frame and which lie in planes perpendicular to the optical axis, a shift ring which is provided between the opposed end surfaces and which is provided on rear and front end surfaces thereof with sliding grooves which extend in the radial direction, said sliding grooves on said rear end surface and said sliding grooves on said front end surface being normal to each other, pins which are provided on the opposed end surfaces and which are slidably fitted in the respective sliding grooves, and a biasing member for normally bringing the opposed end surfaces into close contact with the shift ring to prevent the mount frame, the lens frame and the shift ring from relatively moving in a free state, and for permitting the mount frame, the lens frame and the shift ring to relatively move in planes perpendicular to the optical axis when an external force in the direction perpendicular to the optical axis is applied between the mount frame and the lens frame.

The lens frame is preferably slidable relative to the mount frame in two orthogonal directions in a plane perpendicular to the optical axis. Thus, the adjustment of the optical axis can be easily carried out.

The mount frame or the lens frame can comprise of an annular member which restricts the relative movement therebetween in a plane perpendicular to the optical axis of the lens frame and the mount frame to thereby prevent the disengaging thereof.

The present disclosure relates to subject matter contained in Japanese Patent Application Nos. 8-270873 (filed on Oct.

14, 1996) and 8-283676 (filed on Oct. 25, 1996) which are expressly incorporated herein by reference in their entireties.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
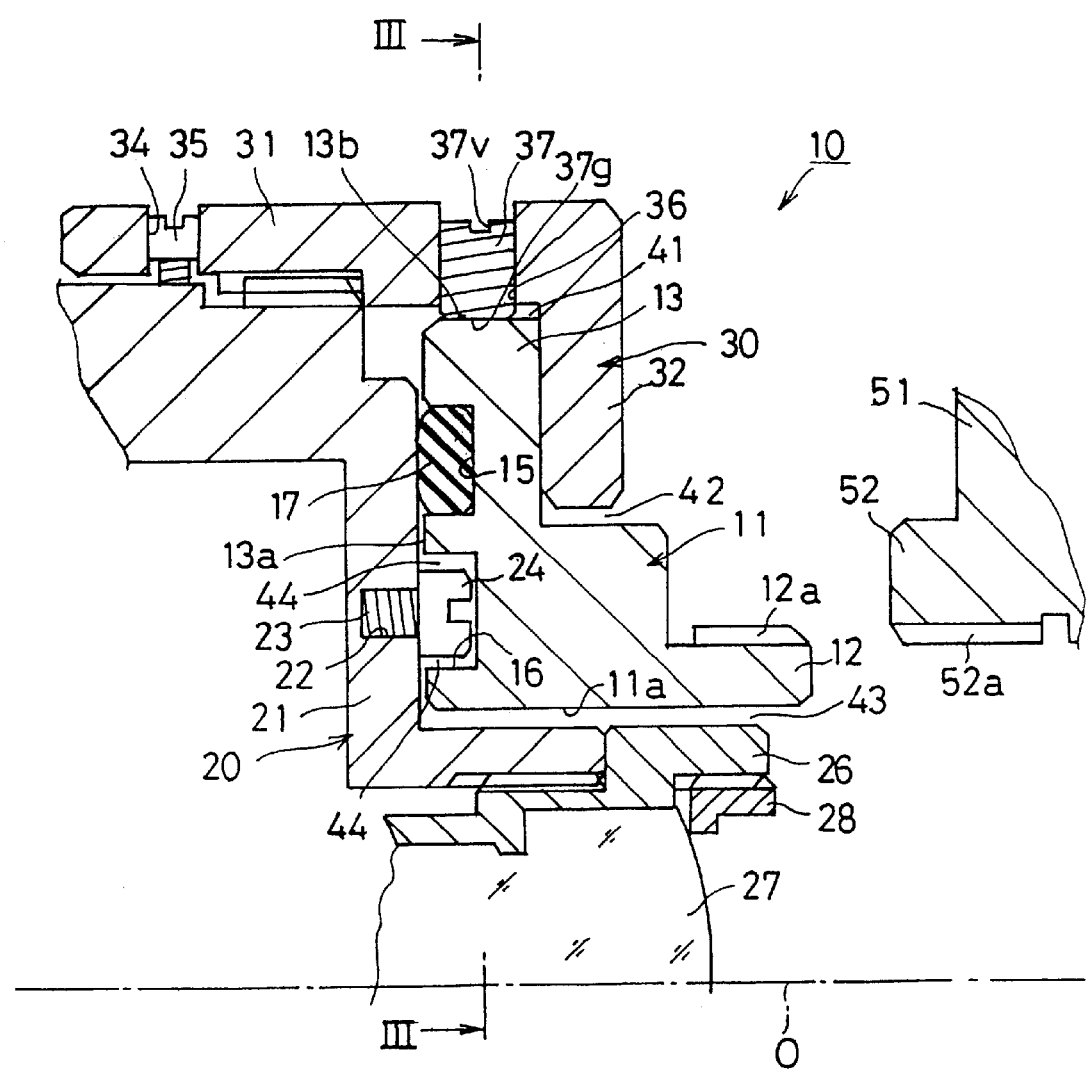
FIG. 1 is a sectional view of an upper half of a mount shift apparatus according to the present invention.

A mount shift apparatus 10 according to the present embodiment includes a mount frame 11 of a lens mount which is screw-engaged with a body mount 52 of a camera body 51. The mount frame 11 is provided with a threaded portion (mount screw portion) 12 having a center axis located on the optical axis O, and a flange 13 perpendicular to the optical axis O. The threaded portion 12 is provided with an external thread 12a which can engage by an internal thread 52a of the body mount 52. The flange 13 is provided with a front surface 13a adjacent to a lens holder frame (lens barrel body) 20 and perpendicular to the optical axis O, and a cylindrical outer surface 13b having a center axis located on the optical axis O.

Figure 2:
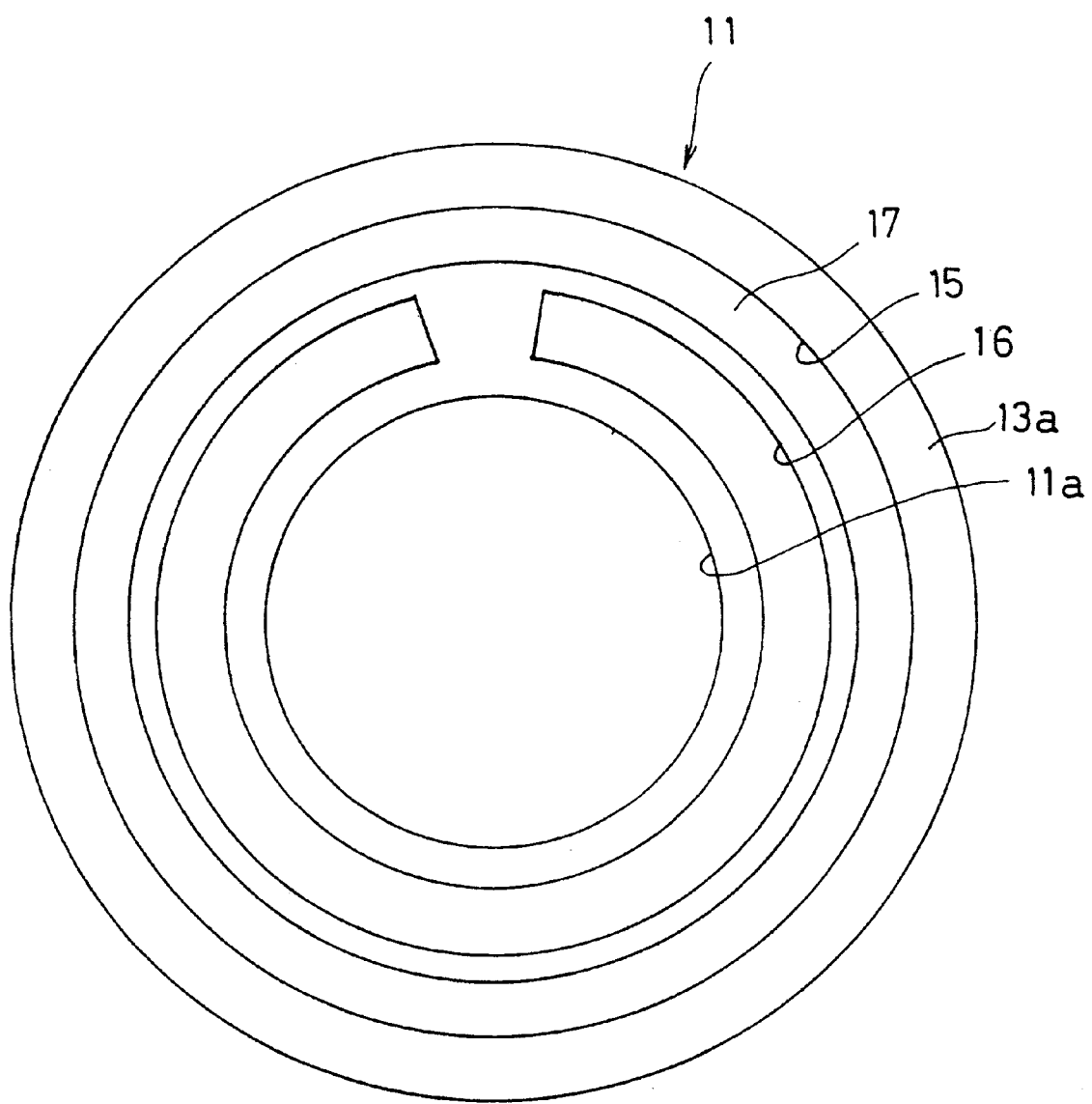
FIG. 2 is a front elevational view of a mount frame of a lens mount.

The flange front surface 13a of the mount frame 11 is provided with an annular groove 15 concentric to a cylindrical bore 11a and a C-shaped rotation restricting groove 16 (FIG. 2). An O-ring 17, made of a resilient member such as rubber, is fitted in the annular groove 15. The thickness of the O-ring 17 is such that the O-ring 17 slightly protrudes forward from the front surface 13a in the optical axis direction (see FIG. 1).

A position restricting ring 21 of the lens holder frame 20 is provided in close proximity to the flange front surface 13a. The position restricting ring 21 is provided with a threaded hole 22 corresponding to the rotation restricting groove 16, so that a rotation restricting screw 23 is screw-engaged in the threaded hole 22. A head 24 of the rotation restricting screw 23 protrudes toward the flange front surface 13a and is fitted in the rotation restricting groove 16. The lens holder frame 20 is capable of rotating relative to the mount frame 11 by a predetermined angle of less than one complete turn, as determined by the rotation restricting groove 16 and the screw head 24 fitted therein. The angular position of the lens holder frame 20 relative to the mount frame 11 is retained by the O-ring 17 which abuts the position restricting ring 21. In general, the lens barrel for a CCTV camera is provided with a mark or indicia which indicates the circumferential position of the lens, or a code member (not shown) which projects in the radial direction, and hence, it is necessary to adjust the angular position of the lens barrel in the circumferential direction.

The lens holder frame 20 holds a photographing lens 27 through a holder ring 26. An annular lens retainer 28 is provided (close to the camera body 51) as part of the lens holder ring 26 and surrounds the peripheral edge of the photographing lens 27, to prevent the photographing lens 27 from being disengaged from the lens holder ring 26. It should be noted in FIG. 1, only a part of one lens element of the photographing lens 27 is shown, and other lens elements of the photographing lens 27 are omitted. Moreover, no detailed concrete structure of the lens holder frame 20 is shown in FIG. 1. That is, the lens holder frame 20 preferably comprises a focusing mechanism, a zoom mechanism and an automatic diaphragm mechanism (not shown).

The mount shift apparatus 10 further includes a mount set ring 30 on the outer peripheries of the mount frame 11 and the lens holder frame 20. The mount set ring 30 is provided with a cylindrical ring 31 having a center axis is identical to the optical axis O, the cylindrical ring 31 surrounding the outer peripheral surface of the lens holder frame 20 and the outer surface 13b of the flange 13. The mount set ring 30 is also provided with a mount holding flange 32 which extends from the rear end of the cylindrical ring 31 in the direction perpendicular to the optical axis O. The cylindrical ring 31 has a threaded hole formed therein 34 in which a securing screw 35 is screwed. The threaded hole 34 extends through the cylindrical ring 31, so that when the securing screw 35 is fastened, the front end of the securing screw 35 abuts the outer peripheral surface of the lens holder frame 20 to thereby firmly connect the mount set ring 30 to the lens holder frame 20. In this state, the flange 13 of the mount frame 11 is held between the position restricting ring 21 of the lens holder frame 20 and the mount holding flange 32. Thus, the mount frame 11, the lens holder frame 20 and the mount set ring 30 are held so as not to move relatively in the optical axis direction O.

Annular spaces 41, 42 and 43 (in a radial direction perpendicular to the optical axis O) between the mount set ring 30 and the mount frame 11 and between the mount frame 11 and the lens holder frame 20. In addition, another annular space 44 is formed between the head 24 of the rotation restricting screw 23 and the rotation restricting groove 16. The lengths of the annular spaces 41 through 44 in the radial direction are substantially identical. Thus, it is possible to move (slide) the lens holder frame 20 and the mount set ring 30 relative to the mount frame 11 by a displacement corresponding to the radial length of the annular spaces 41 through 44 in the direction perpendicular to the optical axis O. When the lens holder frame 20 and the mount set ring 30 are connected by the securing screw 35, both the lens holder frame 20 and the mount set ring 30 can be moved together relative to the mount frame 11 in the direction perpendicular to the optical axis O.

The cylindrical ring 31 is provided with threaded holes 36 having a large diameter and corresponding to the outer peripheral surface 13b of the flange 13. Four threaded holes 36 are spaced from one another at an equiangular distance of 90° around the optical axis O in the circumferential direction of the mount set ring 30. Cylindrical shift screws 37 (37a through 37d) are screwed in the corresponding threaded holes 36. The head portions of the shift screws 37 are provided with rotation operation groove 37v, in which a tool such as a screwdriver can be fitted to rotate the shift screws 37, to thereby adjusting the amount of the screw-engagement of the shift screws 37 with the threaded holes 36. That is, the length of the portions of the shift screws 37 that project from the corresponding threaded holes 36 can be adjusted.

For instance, in FIG. 1, the shift screws 37 are fastened by a predetermined amount, so that the bottom surfaces 37g of the shift screws 37 abut the outer peripheral surface 13b of the flange 13 to support the mount frame 11. In the embodiment illustrated in FIG. 3, the mount frame 11 is held by the bottom surfaces 37g of the four shift screws 37a through 37d.

When the shift screws 37 are fastened at the support position shown in FIG. 1, the bottom surfaces 37g of the shift screws 37 press the outer peripheral surface 13b of the flange 13 toward the optical axis O, expanding the spaces 41 and 42. That is, the mount set ring 30 and the lens holder frame 20 are moved upward relative to the mount frame 11 in FIG. 1. Consequently, the optical axis O of the photographing lens 27 (which is supported by the lens holder frame 20 through the holder ring 26) is shifted upward in parallel. In this state, the space 43 is narrow, and the optical axis O moves until the space 43 becomes zero.

In the mount shift apparatus, the mount frame 11 is supported at four points by the shift screws 37a through 37d, and hence, if one shift screw 37 is fastened, it is necessary in advance to loosen the shift screw diametrically opposed to the fastened shift screw 37, in advance to thereby release the mount frame 11 from the shift screws. For example, when the shift screw 37a is fastened, the shift screw 37c must first be loosened in advance.

The mount shift apparatus 10 operates as follows. Note that in FIGS. 3 and 4, the x-axis is defined by the line connecting the shift screws 37b and 37d, and the y-axis is defined by the line connecting the shift screws 37a and 37c, respectively. The optical axis O of the photographing lens 27 is located at the intersect point of the x-axis and y-axis.

First, the mount frame 11 is screwed in the body mount 52, and all the shift screws 37a through 37d are loosened, so that the lens holder frame 20 and the mount set ring 30 can be rotated relative to the mount frame 11. Thereafter, the lens holder frame 20 and the mount set ring 30 are rotated to move the mark or radially extending code member of the lens to an optional position.

Figure 3:
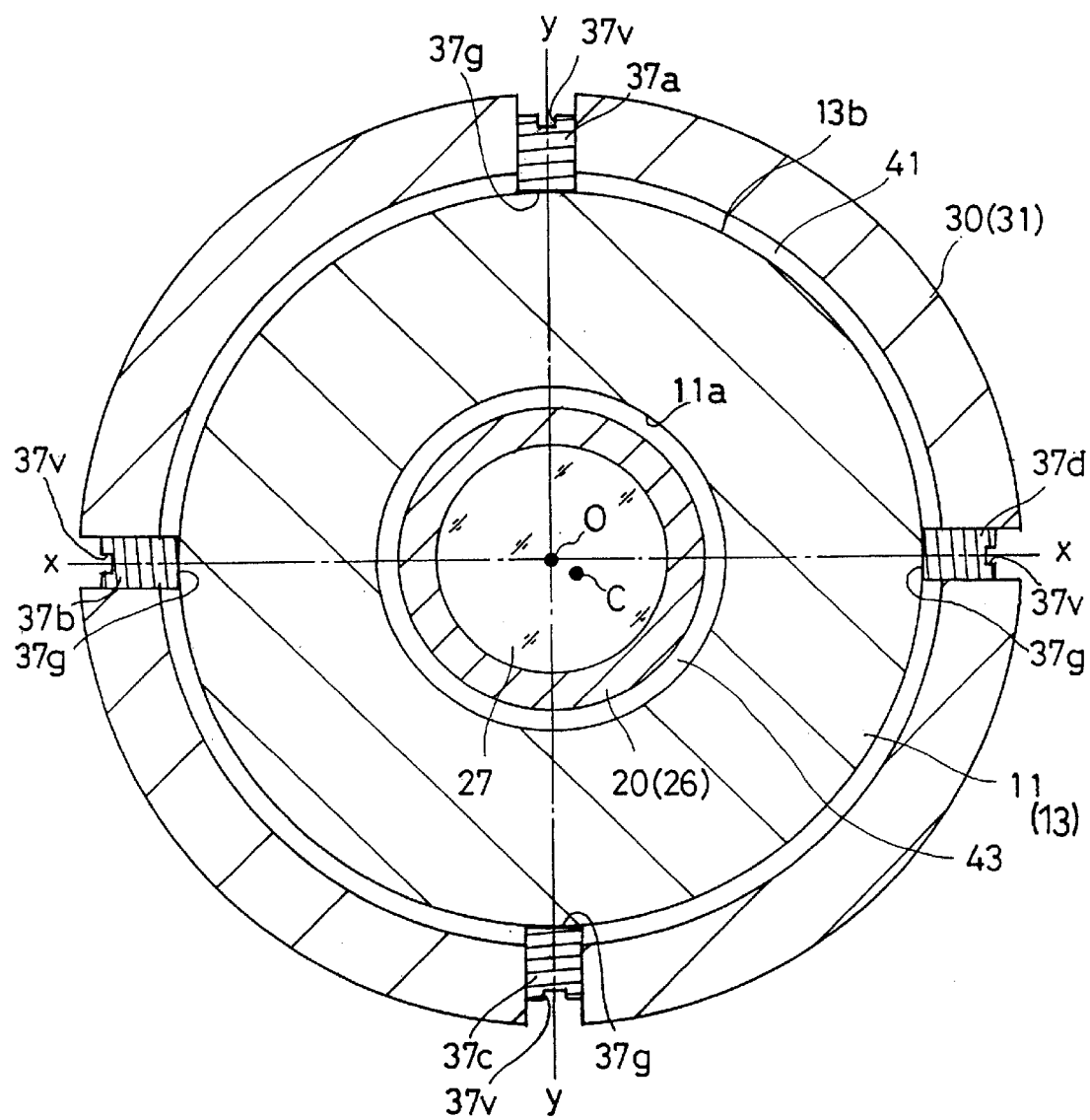
FIG. 3 is a sectional view of a mount shift apparatus, taken along the line III—III in FIG. 1.
Figure 4:
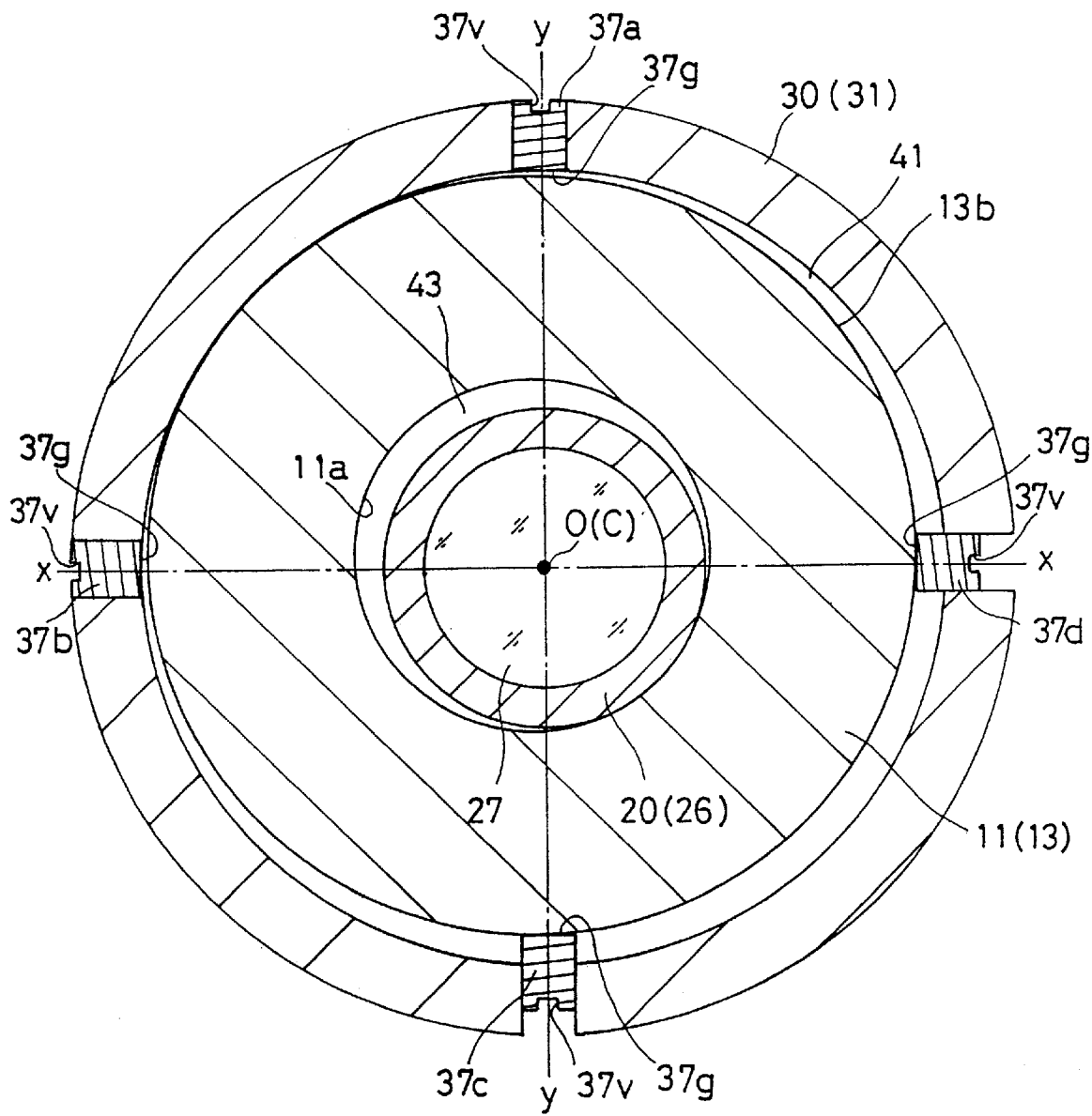
FIG. 4 is a sectional view of a mount shift apparatus viewed from a perspective in which the position of the optical axis relative to the mount frame shown in FIG. 3 is corrected.

When the above-mentioned operation is complete, if the optical axis O is deviated or displaced from the center axis of the light receiving surface (light receiving surface center C) in the x-axis and y-axis directions (as shown in FIG. 3), the securing screw 35 is fastened to secure the lens holder frame 20 and the mount set ring 30. In FIG. 3, the optical axis O is deviated from the light receiving surface center C toward the shift screw 37b in the x-axis direction. As mentioned above, since the optical axis O is moved in the direction opposite to the fastening direction of the shift screw 37 to be fastened, the shift screw 37d, which is diametrically opposed to the shift screw 37b, is rotated and fastened. Consequently, the pressing force is applied by the fastened shift screw 37d to depress the outer peripheral surface 13b of the flange 13, and the mount set ring 30 (lens holder frame 20) and the photographing lens 27 are shifted in parallel with the x-axis toward the shift screw 37d (right direction in FIG. 3). The shift in the x-axis direction continues until the light receiving surface center C is moved onto the y-axis. In this position, the optical axis O is deviated toward the shift screw 37a in the y-axis direction, and hence, the shift screw 37c, which is diametrically opposed to the shift screw 37a, is fastened, so that the mount set ring 30 (lens holder frame 20) and the photographing lens 27 are moved toward the shift screw 37c (lower direction in FIG. 3) along the y-axis. Thus, the optical axis O is identical to the light receiving surface center C (FIG. 4). Finally, the shift screws 37a and 37b (previously loosened) are fastened until the bottoms abut the outer peripheral surface 13b of the flange 13 to support the mount frame 11 at four points (four shift screws). Consequently, the relative position between the mount frame 11 and the optical axis O is fixed after the adjustment. To prevent an accidental displacement of the optical axis O due to an external oscillation, etc., after the adjustment, the shift screws 37a through 37d are fastened until the lens holder frame 20 and the mount set ring 30 cannot be rotated.

As can be seen from the foregoing, the optical axis O can be shifted with respect to the light receiving surface in orthogonal directions (two-dimensional movement) by fastening one or some of the shift screws 37a through 37d appropriately. Since the mount shift apparatus 10 employs a four-point support system having the four shift screws 37a through 37d spaced at an angular pitch of 90° in the circumferential direction, it is possible for an operator to easily perform the adjustment in the two orthogonal directions. Moreover, fine adjustment can be easily achieved by the shift screws (adjusting screws). The amount of shift of the optical axis O can be varied in accordance with the radial lengths of the annular spaces 41 through 44.

Figure 5:
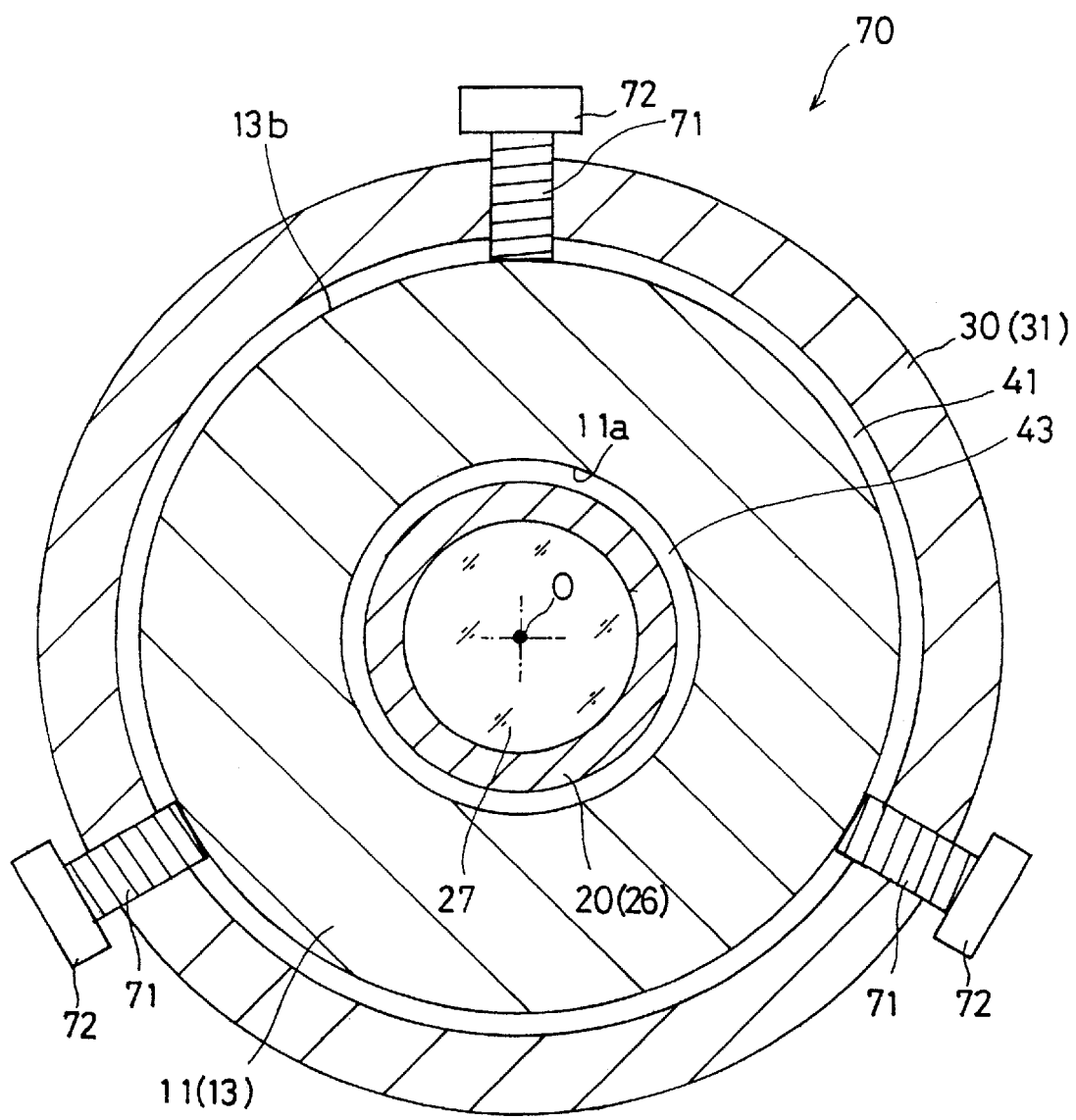
FIG. 5 is a front elevational view of a mount shift apparatus according to another embodiment of the present invention.

FIG. 5 shows a modified embodiment of the mount shift apparatus 10 according to the present invention. The basic structure of the mount shift apparatus 70 shown in FIG. 5 is similar to that of the mount shift apparatus shown in FIGS. 1 through 4. In FIG. 5, the elements corresponding to those in FIGS. 1 through 4 are designated with like reference numerals and no duplicate explanation thereof will be given.

The shift screws 71 of the mount shift apparatus 70 are each provided with an operation knob (handle) 72 which can be manually rotated. The operation knobs 72 enable the operator to rotate the shift screws 71 in order to adjust the position of the optical axis O without using a tool such as a screwdriver. The mount shift apparatus 70 uses a three-point support system including three shift screws 71. It is possible to adjust the optical axis O by appropriately actuating the three shift screws 71 in combination, similarly to the mount shift apparatus 10.

Figure 6:
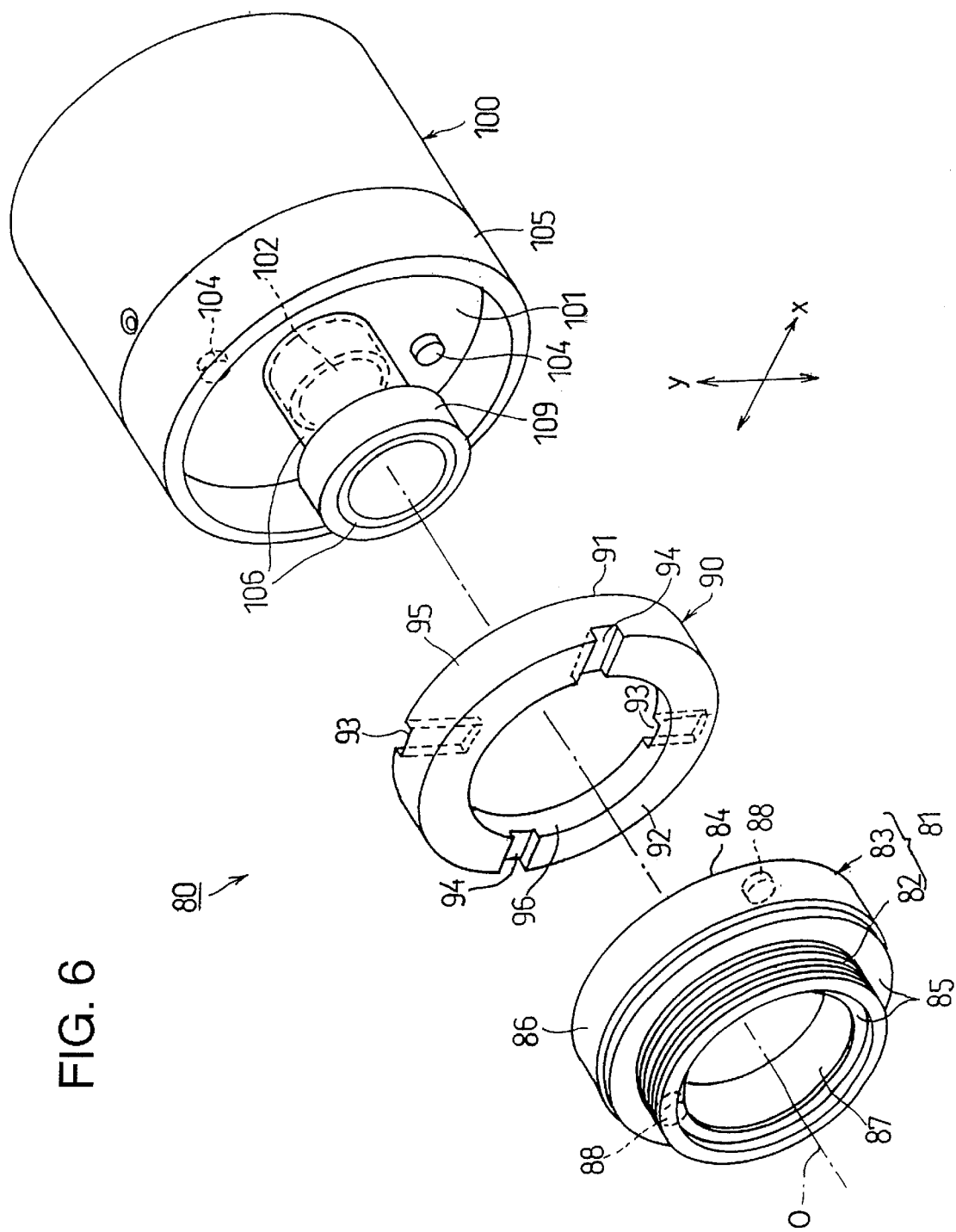
FIG. 6 is an exploded perspective view of a mount shift apparatus according to yet another embodiment of the present invention.

FIG. 6 shows another embodiment of the present invention. The mount shift apparatus 80 shown in FIG. 6 includes a lens mount frame 81 which can be attached to the body mount 122 of the camera body 121 (see FIG. 8). The mount frame 81 is provided with a threaded portion (mount screw portion) 82 which can be screw-engaged by the threaded portion of the camera body mount 122 and a flange 83 perpendicular to the optical axis O. The flange 83 is provided with parallel front end surface 84 and rear end surface 85, a cylindrical outer surface 86 whose center axis is located on the optical axis O, and a cylindrical inner surface 87. The front end surface 84 is provided thereon with a pair of diametrically opposed pins 88 in a symmetrical arrangement. The mount screw portion 82 is provided on the rear end surface 85.

An annular shift ring 90 is located adjacent to the front end surface 84 of the flange. The shift ring 90 is provided with concentric outer and inner peripheral surfaces 95 and 96. The shift ring 90 is provided with parallel front and rear end surfaces 91 and 92. The cylindrical outer and inner peripheral surfaces 95 and 96 have diameters substantially identical to those of the outer and inner peripheral surfaces 86 and 87 of the flange 83. The front and rear end surfaces 91 and 92 of the shift ring 90 are each provided with a pair of shift grooves 93 and 94 having a predetermined width. The shift grooves 93 extend perpendicularly to the shift grooves 94. The x-axis is defined by the line connecting the axes of the shift grooves 94 and the y-axis is defined by the line connecting the axes of the shift grooves 93.

A lens holder frame (lens barrel body) 100 is provided adjacent to the front end surface 91 of the shift ring 90. The lens holder frame 100 is provided on the cylindrical portion thereof with a rear end surface 101 which is opposed to the front end surface 91 of the shift ring 90 and which lies in a plane perpendicular to the optical axis O. A rear end portion of a lens 102 which constitutes a photographing lens group protrudes from the rear end surface 101 at the center thereof. The optical axis O of the photographing lens group is coincident with the axis of the cylindrical lens holder frame 100.

Figure 8:
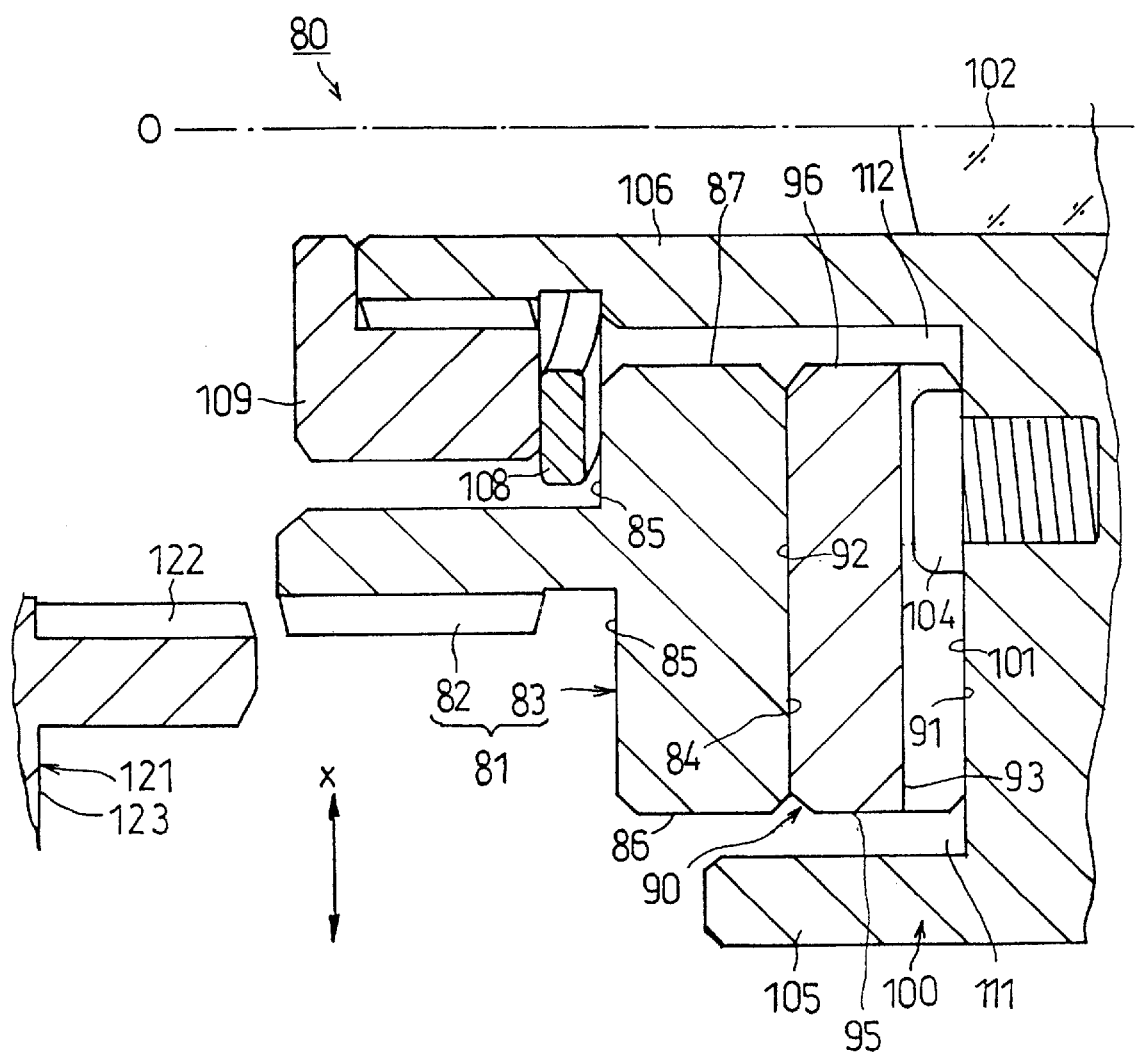
FIG. 8 is a sectional view of the lower half of the assembly shown in FIG. 7, in the direction x and taken along the line VIII—VIII in FIG. 7; and, FIG. 9 is a sectional view of the upper half of the assembly shown in FIG. 7, in the direction y and taken along the line IX—IX in FIG. 7.
Figure 9:
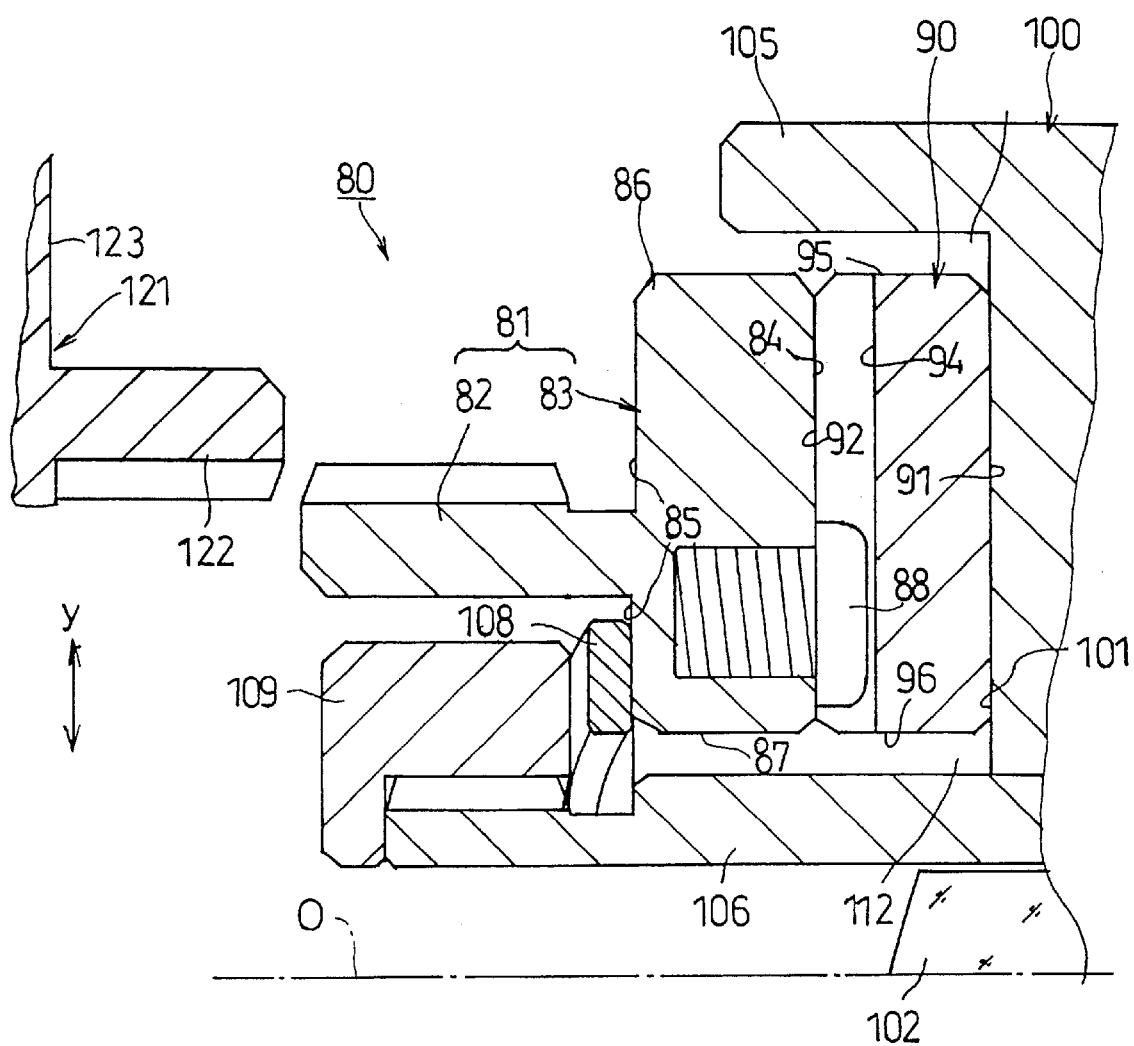

The lens holder frame 100 is supplied, outside the lens 102, with outer and inner restriction rings 105 and 106 coaxial with the optical axis O. A pair of diametrically opposed pins 104 are provided on the end surface 101 of the lens holder frame 100, between the outer and inner restriction rings 105 and 106. A spring holding ring 109 screw-engaged to rear portion of the inner restriction ring 106 holds a leaf spring 108 (FIGS. 8 and 9).

It should be noted that a description of lens elements of the photographing lens other than the lens element 102 is omitted. Moreover, no detailed structure of the lens holder frame 100 is shown in FIG. 1, but the lens holder 100 preferably comprises a focusing mechanism, a zoom mechanism and an automatic diaphragm mechanism (none shown).

Figure 7:
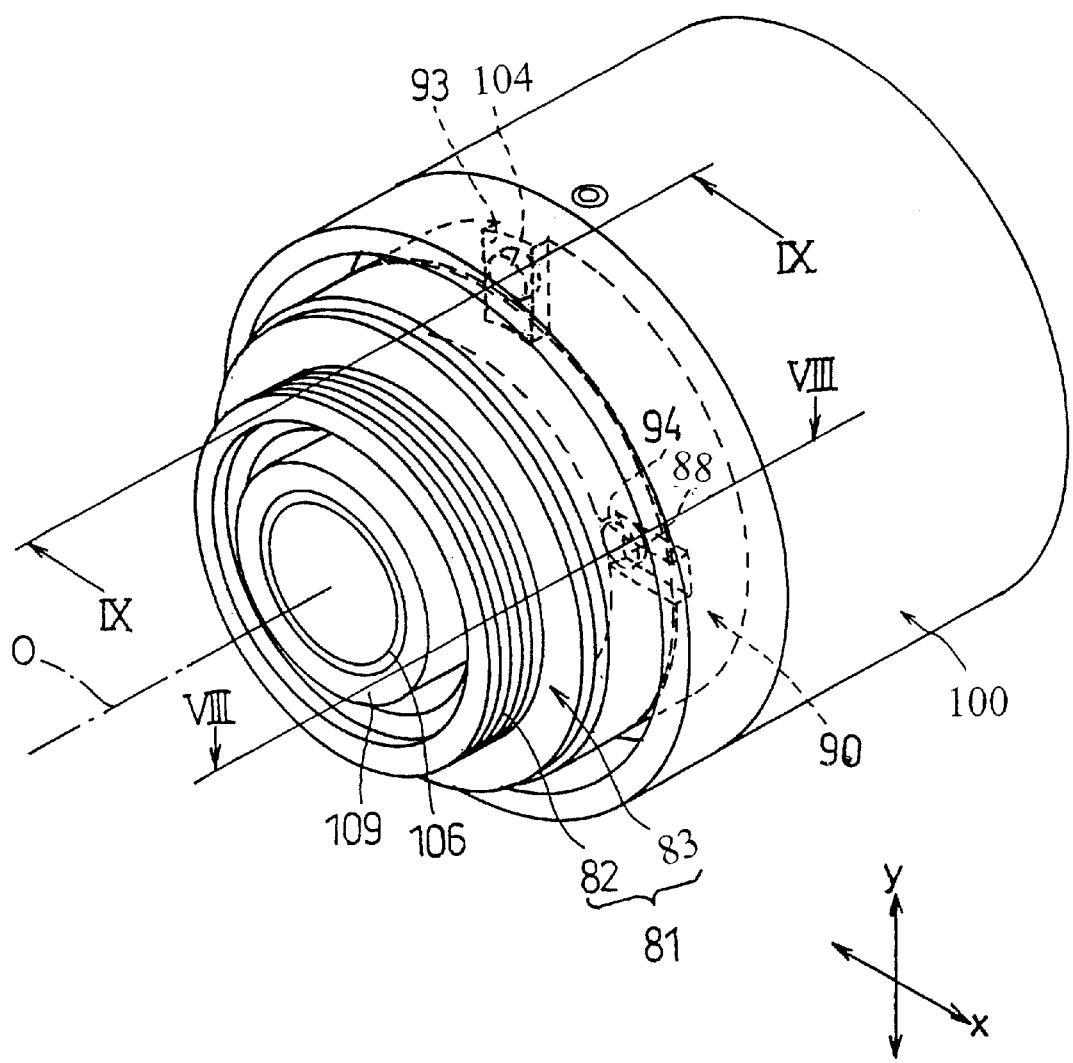
FIG. 7 is a perspective view of a mount shift apparatus in an assembled condition.

The mount frame 81 and the shift ring 90 are assembled by slidably fitting the pins 88 in the shift grooves 94. When the mount frame 81 and the shift ring 90 are mounted between the outer restriction ring 105 and the inner restriction ring 106 to form the mount shift apparatus 10, the pins 104 of the lens holder frame 100 are slidably fitted in the shift grooves 93 (FIG. 7). Namely, the cylindrical inner surfaces 87 and 96 of the mount frame 81 and the shift ring 90 mounted thereto are inserted in the inner restriction ring 106, so that the front end surface 91 of the shift ring 90 abuts against the rear end surface 101. The mount frame 81 and the shift ring 90 are held in place (in an initial position) by the leaf spring 108, which presses the flange rear end surface 85. In the illustrated embodiment, the initial position is a position in which the axis of the mount frame 81 and the shift ring 90 coincides with the optical axis O.

Upon completion of the assembling operation, the flange front end surface 84, the flange rear end surface 85, the shift ring front end surface 91 and the shift ring rear end surface 92 are parallel with the rear end surface 101 of the cylindrical portion of the lens holder frame 100 perpendicular to the optical axis O. Consequently, the x-axis and the y-axis are in a plane normal to the optical axis O.

The holding force (pressure) exerted by the leaf spring 108 and the spring holding ring 109 is such that no relative movement of the mount frame 81, the shift ring 90 and the lens holder frame 100 occurs in a free state, and that the mount frame 81, the shift ring 90 and the lens holder frame 100 can relatively move in a plane perpendicular to the optical axis O when the external force in the direction normal to the optical axis O is applied between the mount frame 81 and the lens holder frame 100.

FIGS. 8 and 9 show sectional views of the assembled mount shift apparatus 80. The mount frame 81 and the shift ring 90 are pressed against the rear end surface 101 of the cylindrical portion of the lens holder frame 100 by the spring force of the leaf spring 108 (i.e., a biasing member), the flange rear end surface 85. The shift ring front end surface 91 abuts the rear end surface 101 of the cylindrical portion in the pressure direction, and hence, the movement in the optical axis direction is restricted.

An annular (radial) space 111 is formed between the flange outer surface 86 (and the shift ring outer peripheral surface 95), and the outer restriction ring 105 in the direction perpendicular to the optical axis O. Also, an annular (radial) space 112 is formed between the cylindrical inner surfaces 87, 96 (of the flange 83 and the shift ring 90, respectively) and the inner restriction ring 106 in the direction perpendicular to the optical axis O. Moreover, the leaf spring 108 provided between the spring holding ring 109 and the flange rear end surface 85 permits the mount frame 81 and the shift ring 90 to elastically move in the optical axis direction by a small amount.

Consequently, the shift ring 90 can be moved relative to the mount frame 81 via the pins 88 and the shift grooves 94 in the x-axis direction. Since the shift ring 90 and the lens holder frame 100 are secured in the x-axis direction, the lens holder frame 100 is also moved relative to the mount frame 81 (due to the relative movement of the shift ring 90 and the mount frame 81) to thereby shift the optical axis O in the x-axis direction. The maximum displacement of the optical axis O in the x-axis direction is obtained when the flange outer peripheral surface 86 or the cylindrical inner surface 87 of the mount frame 81 abuts the outer restriction ring 105 or the inner restriction ring 106 of the lens holder frame 100, eliminating the radial space 112.

Similarly, the lens holder frame 100 can be moved relative to the shift ring 90 through the pins 104 and the shift grooves 93 in the y-axis direction. The optical axis O can thus be moved in the y-axis direction. The maximum shift of the optical axis in the y-axis direction is obtained when the outer peripheral surface 95 of the shift ring 90 or the cylindrical inner surface 96 thereof abuts against the outer restriction ring 105 or the inner restriction ring 106 of the lens holder frame 100.

The mount shift apparatus 80 operates as follows.

First, the mount frame 81, the shift ring 90 and the lens holder frame 100 are assembled by fitting the pins 88 and 34 in the shift grooves 94 and 23. The mount frame 81 and the shift ring 90 are set in the initial position in which the axes thereof coincide with the optical axis O. Thereafter, the mount screw portion 82 is screwed in the camera body mount 122 until the flange rear surface 85 of the mount frame 81 is brought into contact with the mount surface 123 of the camera body 121. Since the pins 88 and 104 are fitted in the shift grooves 94 and 93, respectively (so that no relative rotation between the mount screw portion 82 and the camera body mount 122 occurs), the screwing operation can be carried out.

In this state, if the optical axis O is deviated or displaced from the center axis of the light receiving surface (light receiving surface center) of the camera body, the holder frame 100 is moved in the x-axis direction while holding the camera body 121, so that the shift ring 90 is moved relative to the mount frame 91 in the x-axis direction. Since the shift ring 90 is integrally connected to the lens holder frame 100 in the x-axis direction, the lens holder frame 100 is moved together with the shift ring 90, and thus the optical axis O is shifted in the x-axis direction.

Similarly, the lens holder frame 100 is moved relative to the shift ring 90 in the y-axis direction by moving the lens holder frame 100 in the y-axis direction while holding the camera body 121. Consequently, the optical axis O is shifted in the y-axis direction. When the optical axis O is made coincident with the light receiving surface center of the camera as a result of the movement of the optical axis O in the x-axis direction and the y-axis direction, the adjustment of the optical axis is complete. The position of the optical axis O after the adjustment is maintained by the leaf spring 108 which presses the mount frame 81 and the shift ring 90 against the rear end surface 101 of the cylindrical portion.

Thus, the adjustment of the optical axis can be easily effected by appropriately moving the lens holder frame 100 in the x-axis direction or the y-axis direction while holding the camera body 121, to thereby move the optical axis O in the orthogonal directions with respect to the light receiving surface. Moreover, the amount of shift can be varied by varying the distance between the outer restriction ring 105 and the inner restriction ring 106 or the diameter of the flange 83 or the shift ring 90, etc.

It is preferable that the range of shifting amount by the mount shift apparatus 10 or 80 is set for about from ±0.2 mm to ±0.5 mm in each direction from the initial (neutral) position.

As may be understood from the above discussion, according to the present invention, a mount shift apparatus of a lens for a CCTV camera in which the deviation between the optical axis of the photographing lens and the light receiving surface of the camera body, caused when the photographing lens is attached to the camera body through the screw mounts is easily correctable can be provided.

What is claimed is:

1. A mount shift apparatus of a lens for a CCTV camera comprising:
    a mount frame having a threaded portion which can be screw-engaged by a screw mount of a camera body;
    a lens frame which supports a photographing lens group having an optical axis;
    opposed end surfaces of said mount frame and of said lens frame lie in planes perpendicular to the optical axis;
    a shift ring provided between the opposed end surfaces, rear and front end surfaces of said shift ring having sliding grooves which extend in the radial direction;
    said sliding grooves on said rear end surface and said sliding grooves on said front end surface being normal to each other;
    pins provided on the opposed end surfaces, said pins being slidably fitted in the respective sliding grooves; and
    a biasing member for normally bringing the opposed end surfaces into contact with the shift ring to prevent the mount frame, the lens frame and the shift ring from relatively moving in a free state, and for permitting the mount frame, the lens frame and the shift ring to relatively move in planes perpendicular to the optical axis when an external force in the direction perpendicular to the optical axis is applied between the mount frame and the lens frame.

2. A mount shift apparatus according to claim 1, wherein the lens frame is slidable relative to the mount frame in two orthogonal directions in a plane perpendicular to the optical axis.

3. A mount shift apparatus according to claim 1, one of the mount frame and the lens frame comprises an annular member which restricts the relative movement therebetween in a plane perpendicular to the optical axis of the lens frame and the mount frame.

* * * * *

UNITED STATES PATENT AND TRADEMARK OFFICE
CERTIFICATE OF CORRECTION

PATENT NO. : 6,154,255
DATED : November 28, 2000
INVENTOR(S) : T. Shishido et al.

It is certified that error appears in the above-identified patent and that said Letters Patent is hereby corrected as shown below:

Column 10,
Line 32 (claim 3, line 1), after "claim 1," insert -- wherein --.

Signed and Sealed this

Sixth Day of November, 2001

Attest:

NICHOLAS P. GODICI
*Attesting Officer*  *Acting Director of the United States Patent and Trademark Office*